United States Patent [19]

Percec et al.

[11] Patent Number: 5,114,795

[45] Date of Patent: * May 19, 1992

[54] MULTILAYERED HIGH BARRIER PACKAGING MATERIALS METHOD FOR THE PREPARATION THEREOF

[75] Inventors: Elena S. Percec, Pepper Pike; Lucy Melamud, Beachwood; Gerald P. Coffey, Lyndhurst, all of Ohio

[73] Assignee: The Standard Oil Company, Cleveland, Ohio

[*] Notice: The portion of the term of this patent subsequent to Apr. 3, 2007 has been disclaimed.

[21] Appl. No.: 258,621

[22] Filed: Oct. 17, 1988

[51] Int. Cl.⁵ .................... B32B 27/08; B32B 27/06
[52] U.S. Cl. .................... 428/516; 428/483; 428/515; 428/412; 428/476.1; 428/476.9; 428/517; 428/518; 428/520; 428/523; 428/476.3; 525/71; 525/73; 525/74; 525/78
[58] Field of Search .............. 428/515, 476.3, 483; 525/71, 73, 74, 78

[56] References Cited

U.S. PATENT DOCUMENTS

| | | | |
|---|---|---|---|
| 2,831,826 | 4/1958 | Coover et al. | 260/32.8 |
| 3,378,605 | 4/1968 | Baer et al. | 260/876 |
| 3,586,737 | 6/1971 | Duke et al. | 260/879 |
| 3,634,547 | 1/1972 | Rose et al. | 260/876 |
| 3,652,726 | 3/1972 | Nield et al. | 260/876 |
| 3,676,526 | 7/1972 | Sommerfeld | 260/876 |
| 3,729,531 | 4/1973 | Suling et al. | 260/898 |
| 3,732,339 | 5/1973 | Suling et al. | 260/898 |
| 3,766,142 | 10/1973 | Nield et al. | 260/47 |
| 3,914,337 | 10/1975 | Giddings et al. | 260/876 R |
| 3,939,223 | 2/1976 | Powell et al. | 260/876 |
| 3,954,913 | 5/1976 | Uebele et al. | 260/880 |
| 3,962,371 | 6/1976 | Alberts et al. | 260/876 R |
| 4,082,895 | 4/1978 | Backderf et al. | 428/412 |
| 4,109,037 | 8/1978 | Nohara | 428/35 |
| 4,123,576 | 10/1978 | Kobayashi et al. | 428/35 |
| 4,139,665 | 2/1979 | Herrero | 428/35 |
| 4,153,548 | 5/1979 | Li et al. | 260/896 |
| 4,160,001 | 7/1979 | Rosen | 525/230 |
| 4,195,135 | 3/1980 | Li et al. | 525/69 |
| 4,299,931 | 11/1981 | Coran et al. | 525/95 |
| 4,307,207 | 12/1981 | Wiggins et al. | 525/66 |
| 4,339,502 | 7/1982 | Gerry et al. | 428/411 |
| 4,359,506 | 11/1982 | Wiggins et al. | 428/412 |
| 4,397,987 | 8/1983 | Cornell | 525/75 |
| 4,409,365 | 10/1983 | Coran et al. | 525/78 |
| 4,410,595 | 10/1983 | Matsumoto et al. | 428/412 |
| 4,415,620 | 11/1983 | Wiggins et al. | 264/171 |
| 4,452,835 | 6/1984 | Vasudevan | 428/35 |
| 4,452,943 | 6/1984 | Goldman | 525/105 |
| 4,540,754 | 9/1985 | Kobashi et al. | 526/88 |
| 4,588,774 | 5/1986 | Dean | 525/73 |
| 4,605,700 | 8/1986 | Le-Khac | 525/73 |
| 4,753,845 | 6/1988 | Sumi et al. | 428/327 |
| 4,772,348 | 9/1988 | Hirokawa et al. | 156/272.6 |
| 4,914,138 | 4/1990 | Percec et al. | 525/71 |

FOREIGN PATENT DOCUMENTS 0196499 8/1986 European Pat. Off. .
2132395 4/1972 France .

OTHER PUBLICATIONS

"Kraton FG 1901X Rubber" Shell Chemical Company Technical Bulletin, SC:941-87.

Shell Chemical Company Technical Bulletin, Mar., 1987 "Gas Permeability of Kraton Rubbers".

*Primary Examiner*—George F. Lesmes
*Assistant Examiner*—Terrel Morris
*Attorney, Agent, or Firm*—Larry W. Evans; Joseph G. Curatolo; Sue E. Phillips

[57] ABSTRACT

Multilayered high barrier film products providing gas and moisture barrier properties. The film products comprise at least a first polymer film having low permeability to moisture and a polymer blend film containing a gas barrier polymer and a second polymer functionalized for compatibility with the gas barrier polymer and so as to allow the polymer blend film to adhere to the first polymer film. A method for the preparation of multilayered high barrier film products includes the steps of forming a gas barrier polymer film from a polymer blend containing a gas barrier polymer and a second polymer and, bonding a moisture barrier polymer film to at least one side of the gas barrier film.

17 Claims, No Drawings

MULTILAYERED HIGH BARRIER PACKAGING MATERIALS METHOD FOR THE PREPARATION THEREOF

TECHNICAL FIELD

This invention relates to multilayered films which display improved impermeability to oxygen and moisture as well as toughness and processability. The multilayered film products employ barrier resins, such as high nitrile polymers, which are noted for their gas barrier properties, and polyolefins, which are characterized by high strength, excellent moisture and water vapor resistance, fair chemical resistance and variable processability. While no single polymer or copolymer can possess all of these properties, the proper combination of different polymers in multilayered structures has been found to provide a good balance. Such films are useful for packaging applications, particularly in the food industry.

BACKGROUND OF THE INVENTION

Properties such as protection from oxygen and moisture are of great importance in plastic packaging applications, as are toughness and processability. Generally, no single polymer is capable of providing the correct balance of all the properties that are required for various types of packaging applications. Polyolefins, for instance, are characterized by toughness, excellent moisture and water vapor resistance and fair chemical resistance, but suffer from poor gas barrier properties and variable processability. High nitrile polymers, on the other hand, have outstanding gas barrier properties but only modest water and vapor properties.

While it would be highly advantageous to incorporate the desirable characteristics of each type of polymer into a single material, high nitrile polymers and polyolefins are not readily combined. However, when a small amount of a functionalized polyolefin is employed as a third component, blends of high nitrile polymers and polyolefins are obtained. Nevertheless, the transport properties of such multicomponent systems are controlled by the continuous phase. At low concentrations of polyolefin, the water vapor barrier enhancement is very small while at high concentrations, the oxygen barrier properties are substantially decreased.

Heretofore, when it has been desirable to form a multilayered film product comprising outer layers of tough, moisture resistant polyolefins and an inner layer providing gas barrier protection, it has been necessary to employ tie layers therebetween because of the incompatibility of the polyolefin and barrier resin layers. Thus, where three layers are functional, an additional two layers have been required to form such products.

U.S. Pat. No. 4,339,502, for instance, is directed toward a laminated structure comprising nitrile barrier resin and thermoplastic resin layers joined by a tie layer comprising a nitrile barrier resin and a vinyl aromatic diene block copolymer rubber.

U.S. Pat. No. 4,359,506 is directed toward a laminated structure which combines outer layers of a nitrile barrier resin and a thermoplastic resin with a tie layer comprising a mixture of a nitrile barrier resin, a halogenated polyolefin and a thermoplastic resin.

U.S. Pat. No. 4,415,520 is directed toward a process for bonding together a nitrile barrier resin with a thermoplastic resin to produce a laminate. A tie layer comprising a mixture of a nitrile barrier resin and a halogenated polyolefin and a thermoplastic resin other than the first two polymers is disclosed for bonding the first two film layers together.

It has now been found possible to structure the two polymers into a multilayered material by the use of functionalized polyolefins. In particular, an inner layer is formed comprising a high nitrile polymer, or other gas barrier polymer, and a small amount of functionalized polyolefin. This layer provides a dual function of gas barrier protection and adhesion promotion to the exterior layers which are polyolefins.

DISCLOSURE OF THE INVENTION

It is, therefore, an object of the present invention to provide multilayered film structures having oxygen, carbon dioxide and moisture barrier properties.

It is another object of the present invention to provide multilayered packaging films comprising polyolefins and polymer blends of gas barrier polymers with various polyolefins.

It is another object of the present invention to provide a method for the preparation of multilayered high barrier film products.

These and other objects, together with the advantages thereof over known multilayered polymer film products, which shall become apparent from the specification which follows, are accomplished by the invention as hereinafter described and claimed.

In general, the present invention provides multilayered high barrier film products which comprise at least a first polymer film having low permeability to moisture and a polymer blend film containing a gas barrier polymer and a second polymer functionalized for compatibility with the gas barrier polymer so as to allow the polymer blend film to adhere to the first polymer film.

The present invention also provides a method for the preparation of multilayered high barrier film products which comprises the steps of forming a gas barrier polymer film from a polymer blend containing a gas barrier polymer and a second polymer and, bonding a moisture barrier polymer film to at least one side of the gas barrier film.

PREFERRED EMBODIMENT FOR CARRYING OUT THE INVENTION

The multilayered structures of the present invention display improved oxygen and moisture barrier properties. A unique feature of these structures is the fact that the film layer providing the gas barrier properties is modified so as to provide good adhesion to a polyolefin or other moisture barrier film layer bonded thereto without the necessity of a separate, adhesive tie layer.

The polymer providing gas barrier properties is preferably a high nitrile polymer but can also include other polymers. Representative examples of other gas barrier polymers include polyvinylchloride (PVC); polyvinylidene chloride (PVDC); methyl methacrylate/styrene copolymers (70:30 weight percent, respectively) grafted onto a diene elastomer, as described hereinbelow, (XT); amorphous and crystalline polyamides such as nylon-6 and nylon-66; crystalline polyesters such as polyethylene terephthalate; polyurethanes; polycarbonate; polyphenylene oxide (PPO); polyphenylene oxide/polystyrene blends; polystyrene; polyetherimide and polyalkyl methacrylates. Selection of the gas barrier polymer will depend, in part, on the end use application which may require high gas barrier properties or may be only moderate.

The nitrile polymers useful in this invention are those produced by polymerizing a major proportion of a monounsaturated nitrile, e.g., acrylonitrile, and a minor proportion of another monovinyl monomer component copolymerizable therewith, optionally in the presence of a diene rubber which may be a homopolymer or copolymer of a conjugated diene monomer.

The high nitrile polymer compositions can be prepared by any of the generally known techniques of polymerization including bulk polymerization, solution polymerization and emulsion or suspension polymerization by batch, continuous or intermittent addition of the monomers and other components. The preferred method is by emulsion or suspension polymerization in an aqueous medium in the presence of a free-radical generating polymerization initiator at a temperature of from about 0° C. to 100° C. in the substantial absence of molecular oxygen.

More particularly, the olefinically unsaturated nitriles that can be employed in the present invention include the alpha, beta-olefinically unsaturated mononitriles having the structure:

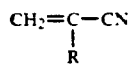

wherein R is hydrogen, a lower alkyl group having from 1 to 4 carbon atoms or a halogen. Such compounds include acrylonitrile, alpha-chloroacrylonitrile, alpha-fluoroacrylonitrile, methacrylonitrile, ethacrylonitrile and the like. The most preferred olefinically unsaturated nitriles useful in the present invention are acrylonitrile and methacrylonitrile and mixtures thereof.

The monomer component copolymerizable with the olefinically unsaturated nitrile includes one or more of the esters of olefinically unsaturated carboxylic acids, vinyl esters, vinyl ethers, vinyl ketones, alpha-olefins, vinyl aromatic monomers, and others.

The esters of olefinically unsaturated carboxylic acids include those having the structure:

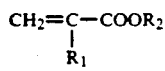

wherein $R_1$ is hydrogen, an alkyl group having from 1 to 6 carbon atoms, or a halogen, and $R_2$ is an alkyl group having from 1 to 30 carbon atoms. Compounds of this type include methyl acrylate, ethyl acrylate, the propylacrylates, the butyl acrylates, and amyl acrylates, the hexyl acrylates, methyl methacrylate, ethyl methacrylate, the propyl methacrylates, the butyl methacrylates, the amyl methacrylates and the hexyl methacrylates, methyl alpha-chloroacrylates, ethyl alpha-chloroacrylates and the like. Most preferred in the present invention are methyl acrylate, ethyl acrylate, methyl methacrylate and ethyl methacrylate.

The alpha-olefins useful in the present invention are those having at least 4 and as many as 10 carbon atoms having the structure:

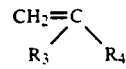

wherein $R_3$ and $R_4$ are alkyl groups having from 1 to 7 carbon atoms, and more specifically isobutylene, 2-methyl butene-1, 2-methyl pentene-1, 2-methyl hexene-1, 2-methyl heptene-1, 2-methyl octene-1, 2-ethyl butene-1, 2-propyl pentene-1, and the like. Most preferred is isobutylene.

The vinyl ethers include methyl vinyl ether, ethyl vinyl ether, propyl vinyl ethers, the butyl vinyl ethers, methyl isopropenyl ether, ethyl isopropenyl ether and the like. Most preferred are methyl vinyl ether, ethyl vinyl ether, the propyl vinyl ethers, and the butyl vinyl ethers.

The vinyl esters include vinyl acetate, vinyl propionate, the vinyl butyrates and the like. Most preferred is vinyl acetate. The vinyl aromatic monomers include styrene, alpha-methyl styrene, the vinyl toluenes, the vinyl xylenes, indene and the like. Most preferred is styrene.

The olefinic nitrile copolymer is optionally polymerized in the presence of a preformed diene rubber which may be a homopolymer or copolymer of a conjugated diene monomer. These monomers include 1,3-butadiene, isoprene, chloroprene, bromoprene, cyanoprene, 2,3-dimethyl 1,3-butadiene, 2-ethyl 1,3-butadiene, 2,3-diethyl 1,3-butadiene and the like. Most preferred for the purpose of this invention are 1,3-butadiene and isoprene because of their ready availability and their excellent polymerization properties. These elastomers may also be present in the gas barrier polymer, designated XT hereinabove.

The conjugated diene monomer may be copolymerized with a comonomer selected from the group consisting of vinyl aromatic monomer, an olefinic nitrile monomer having the structure:

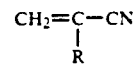

wherein R has the foregoing designation, and an ester having the structure:

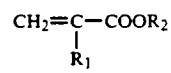

wherein $R_1$ and $R_2$ have the foregoing designations. The rubbery polymer contains from 50 percent to 100 percent by weight of polymerized conjugated diene monomer and from 0 percent to 50 percent by weight of a comonomer.

Preferred polymers useful in this invention are those prepared by the polymerization of 100 parts by weight of (A) from 60 percent to 90 percent by weight of at least one nitrile having the structure:

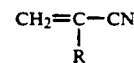

wherein R has the foregoing designation and (B) from 10 percent to 40 percent by weight based on the combined weights of (A) and (B) of at least one member selected from the group consisting of an ester having the structure:

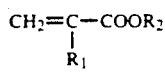

wherein $R_1$ and $R_2$ have the foregoing respective designations; and alpha-olefins having the structure:

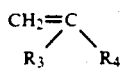

wherein $R_3$ and $R_4$ have the foregoing respective designations; a vinyl ether selected from the group consisting of methyl vinyl ether, ethyl vinyl ethers, the propyl vinyl ethers, and the butyl vinyl ethers; vinyl acetate; styrene and indene, in the presence of from 0 to 40 parts by weight of (C) a rubbery polymer of a conjugated diene monomer selected from the group consisting of butadiene and isoprene and optionally a comonomer selected from the group consisting of styrene, a nitrile monomer having the structure:

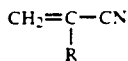

wherein R has the foregoing designation, and an ester having the structure:

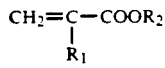

wherein $R_1$ and $R_2$ have the foregoing respective designations, said rubbery polymer containing from 50 percent to 100 percent by weight of polymerized conjugated diene and from 0 percent to 50 percent by weight of a comonomer.

The most preferred nitrile polymers are prepared by the polymerization of between 70 and 80 parts by weight of (A) and 20 to 30 parts by weight of (B) in the presence of from 5 to 15 parts by weight of (C). One particularly suitable nitrile polymer that can be employed as the gas barrier film is Barex 210, a trade name for the commercial product of BP America, Inc., a subsidiary of British Petroleum Company, which is a poly(acrylonitrile-methyl acrylate-butadiene) composition (70:21:9) having a number average molecular weight of 50,000.

Thermoplastic high nitrile resins of at least 70 percent by weight of a monounsaturated nitrile and up to 30 percent by weight of at least one other comonomer and which may also be rubber modified have previously been described in U.S. Pat. Nos. 3,426,102, 3,586,737, 3,763,278, the subject matter of which is incorporated herein by reference. These polymers have excellent barrier properties and can be molded into containers, pipes, films, sheets and the like, to be used for packaging solids, liquids and gases of various types.

In order to prepare the multilayered film products of the present invention, it is necessary to blend the gas barrier polymer with a functionalized polyolefin. From related investigations, we have found that polyolefin functionalization with polar moieties leads to compatibilization with high nitrile polymers. More particularly, at the molecular level, functional groups, inserted onto polyolefin chains, give rise to molecular interactions with reactive sites of high nitrile polymer chains. These interactions are believed to be responsible for the compatibility of the blends.

Suitable polyolefins that can be blended with the gas barrier polymer are formed from alpha-monoolefin monomers having from 2 to about 6 carbon atoms. Representative examples include poly(ethylene) or PE; poly(propylene) or PP and poly(ethylene-co-propylene) or PEP. The polyolefins are functionalized or modified with unsaturated compounds such as unsaturated carboxylic acids, esters, anhydrides and imides which include, for instance, acrylic and methacrylic acid; acrylates and methacrylates; maleic anhydride; N-phenylmaleimide and the like. The functionalization of polyolefins with such molecules bearing polar groups can be performed by means of copolymerization or grafting reactions promoted by radical initiators. Accordingly, representative functionalized polyolefins include poly(ethylene-co-maleic anhydride) or PEMA; poly(ethylene-g-maleic anhydride) or PE-g-MA; poly(propylene) grafted with maleic anhydride or PP-g-MA; and poly(propylene) grafted with acrylic acid or PP-g-AcA. Ternary blends can also be formed, based on the foregoing binary blends, which contain a third or ternary unfunctionalized polyolefin as above, being formed from a monomer having 2 to about 6 carbon atoms or, a different, functionalized polyolefin as above, that is, being formed from a monomer having 2 to about 6 carbon atoms and functionalized with one of the foregoing unsaturated compounds. Such ternary blends can contain high density polyethylene or HDPE, or isotactic polypropylene or PP as a third component.

Functionalization of the polyolefin can be accomplished by a grafting procedure which involves forming a solution of the polyolefin followed by the addition of the unsaturated monomer and a free radical initiator such as dicumyl peroxide. The grafting reaction may also be carried out by adding unsaturated monomer and initiator to molten polyolefin in an extruder.

Ethylene-maleic anhydride copolymer (PEMA) can also be prepared by reacting ethylene and maleic anhydride in an autoclave with or without a solvent such as toluene at a temperature of 85° to 100° C. in the presence of benzoyl peroxide and at pressures of 860 to 950 atmospheres (87.2 to 96.3 MPa).

Blends of the high nitrile polymer or other gas barrier polymer and functionalized polyolefin can comprise from about 80 to 99 parts by weight of the gas barrier polymer and from about 20 to 1 parts by weight of the functionalized polyolefin. Additionally, from about 95 to 5 parts by weight of an unfunctionalized polyolefin, such as HDPE or PP, can be added to form a ternary blend with a corresponding decrease in the amount of one or both of the binary components. Blends of high nitrile polymers and functionalized polyolefins such as poly(ethylene-co-maleic anhydride) are prepared by conventional solution or melt blending, the latter being preferred. For solution blending a mutual solvent such as dimethylformamide (DMF) or N,N-dimethylacetamide (DMAC) and the like is selected to which the polymers are added. Mixing occurs at ambient pressure and temperature for a time of from about 1 to 6 hours. Polymer films can be subsequently formed by casting, evaporation of the solvent and drying, as is known in the art.

For melt blending, the polymer components can be combined in a Brabender Plasticorder at temperatures of about 180° C., or the necessary temperature to melt the components. Films can be prepared by compression molding at about 180° C., followed by slow cooling to ambient temperature.

Preparation and characterization of the properties of blends comprising high nitrile polymers and functionalized polyolefins has been described in copending application, Ser. No. 234,912, now U.S. Pat. No. 4,914,138 owned by the Assignee of record herein. The subject matter of that application is incorporated herein by reference.

Regarding the exterior layers of the multilayered film products of the present invention, a suitable polymer having desired water or vapor barrier properties, referred to collectively as moisture barrier, is selected. Polymers that can be employed include the polyolefins described hereinabove, formed from alpha-monoolefin monomers having from 2 to about 6 carbon atoms, which are not functionalized. Preferred polyolefins are polyethylene and polypropylene. Commercially available polyethylenes can be employed such as HDPE, low density polyethylene (LDPE) and linear low density polyethylene (LLDPE). Commercially available polypropylene that can be employed includes crystalline isotactic polypropylene.

Other polymers that can be employed as the outer or exterior layers of the multilayered film products include amorphous and crystalline polyamides; crystalline polyesters; polycarbonate; XT; PPO; polystyrene (PS); PPO/PS copolymers PVC; polyalkyl methacrylates; styrene acrylonitrile copolymer (SAN); transparent grades of toughened SAN and, acrylonitrile-butadiene-styrene copolymer (ABS).

As with the gas barrier polymers, the selection of the exterior polymer layers will also depend, in part, upon the end use application which may require high water/vapor barrier properties, e.g., low permeability, or only moderate properties. The fact that certain polymers such as polycarbonate, PVC and the like can be selected as the gas barrier or the moisture barrier polymer is attributable again to the end use application.

Where very high gas barrier properties are desired, a high nitrile polymer may be selected. While a multilayered structure can be prepared utilizing a polyolefin as the exterior, moisture barrier layer, a more polar material such as polycarbonate would allow better adhesion. In another instance, gas barrier properties may not be as important as moisture barrier and, therefore, polycarbonate can be provided in the inner layer in a multilayered structure with a more aggressive moisture barrier exterior layer such as a polyolefin. Of course, it is not likely that the inner and outer layers of a given product would both contain the same major polymer component such as a polycarbonate because the purpose of the invention is to provide multilayered structures having dissimilar layers and which do not require an adhesive layer therebetween.

The foregoing exterior layer polymers can also be employed in lieu of the polyolefins to form blends with the gas barrier polymer. To combine the layers does require functionalization and, therefore, any of the polymers blended with any gas barrier polymer should be functionalized to provide compatibility between the two which, in turn, facilitates bonding to the exterior layers without the use of adhesives. The exterior layers can be used unfunctionalized or functionalized.

While functionalization of the second polymer of the polymer blend obviates the need for employing a separate tie layer between the gas barrier polymer film and the moisture barrier polymer film, it should be noted that a separate tie layer can optionally be employed. Such a use may be desired where the adhesion between the two polymer film layers selected is not adequate for the intended use or because the layers do not adhere together as strongly as other layers might.

Suitable tie layer polymers include chlorinated polyolefins, such as chlorinated polyethylenes having from about 25 to about 42 percent chlorine and chlorinated polypropylenes having up to about 65 percent chlorine; ethylene vinyl acetate copolymer and thermoplastic elastomers functionalized with anhydrides. Commercially available products include the Kraton ® family of thermoplastic elastomers (TPE's) such as Kraton ® FG 1901X Rubber, a maleic anhydride functionalized triblock copolymer consisting of polystyrene endblocks and poly(ethylene/butylene) center blocks available from Shell Chemical Company. Ethylene vinyl acetate copolymer is commercially available under the tradename Bynel CXA 1025, also from Shell Chemical Company.

The optional tie layer is a minor component of the film product which can be employed in amounts of about one to about 25 parts by weight, per 100 parts of the polymer blend film layer, with one to about five parts by weight being preferred.

With respect to the principal invention, while a single water or vapor barrier polymer film can be laminated to the gas barrier film layer to form a bi-layer structure for some embodiments, the preferred form is to employ two such layers, with the inner, barrier layer sandwiched therebetween, providing a tri-layer structure.

Exemplary three-layer films of the present invention comprise PE, Barex/PE-g-MA, PE; PP, Barex/PE-g-MA, PP; PP, Barex/PP-g-AcA, PP; PP, Barex/PP-g-MA, PP; PE, Barex/PEMA, PE; PE, Barex/PP-g-AcA, PE; and the like. The composition of the inner layer can vary with the polymer blends described hereinabove although generally, only a small fraction of the blend, on the order of 1 to 20 percent by weight, must comprise the functionalized polyolefin.

The multilayered structures can be prepared via conventional means including coextrusion and laminating according to conditions typically employed to prepare polymer films and coextruded structures. It is to be appreciated that conventional fabrication techniques can be employed to form these materials into the shape required for rigid and semi-rigid packaging uses. Again, it can be appreciated that coextrusion is immediately simplified because intermediate tie layers need not be coextruded. Hence, the coextrusion die employed to produce a tri-layer structure only requires three separate passageways, rather than five. Of course, if an optional tie layer is to be employed, as described hereinabove, then a conventional coextrusion die can be employed.

In order to demonstrate practice of this aspect of the present invention, three multilayered structures were fabricated and tested as reported hereinbelow. The inner, barrier layer films were formed from the following polymer blends: Barex 210/PP-g-AcA; Barex 210/PE-g-MA; and, Barex 210/PP-g-MA. Composition was fixed at 90/10 weight percent nitrile/polyolefin for Examples 1 and 2 and 50/50 for Example 3. Films were prepared via compression molding at 194° C. for 5 minutes employing PE and PP as exterior layers, as well as PP-g-MA in one example. Film thicknesses were not measured and it is to be understood that appropriate optimizations of film thicknesses can be readily made by those skilled in the art depending upon the barrier requirements desired in the resulting multilayered film product.

The polymers PE and PP and the copolymer PEMA were obtained from Aldrich Chemical Co. The polymer PP-g-AcA, having a degree of grafting equal to or less than 6 percent, is produced by BP Performance Polymers and is available under the trade name Polybond. The nitrile polymer, Barex 210, was obtained from BP America, Inc., as noted hereinabove.

The polymer PE-g-MA was synthesized by grafting according to the following procedure. In a flask equipped with a nitrogen inlet and a condenser 5.0 g of high density polyethylene were dissolved in anhydrous xylene at 80° C. When dissolution was complete, the temperature was allowed to rise to 140° C. and 10 g of maleic anhydride was added to the system together with 0.5 g of dicumyl peroxide dissolved in 10 ml of anhydrous xylene. After 3 hours the reaction was stopped and the grafted polymer, poly(ethylene-g-maleic anhydride) was precipitated in acetone and repeatedly washed with acetone. The obtained polymer was dried in a vacuum oven for 48 hours at 50° C. The degree of grafting, estimated from IR spectroscopic data was 1 to 2.5 percent.

The blends were prepared by melt mixing in a torque rheometer (C. W. Brabender Inc. model EPL-V5501) at 180° C. Films were obtained by compression molding the melt in a Carver press set at 180° C. followed by slow cooling to room temperature.

These three laminates were tested for permeability to water vapor, e.g., water vapor transmission rate (WVTR) and oxygen permeability, or oxygen transmission rate (OTR). For comparative purposes, barrier characteristics of Barex 210 and PE alone as controls were also measured as Examples 4 and 5. The results are reported in Table I.

TABLE I

Barrier Characteristics for Three Layer Structures

| Ex. No. | Structure Composition | | WVTR g/mil/100 in$^2$ 24 hr atm | OTR cm$^3$ mil/100 in$^2$ 24 hr atm |
|---|---|---|---|---|
| | Exterior Layers | Interior Layer | | |
| 1 | PE | B210/PE-g-MA (90/10) | 3.6 1.8 | 4.35 7.4 |
| 2 | PE-g-MA | B210/PEMA (50/50) | 1.74 | 23.26 |
| 3 | PP | B210/PP-g-AcA (90/10) | 0.18 0.46 | 9.48 11.38 |
| 4 | PE | 0 | 0.48 | 188.4 |
| 5 | 0 | B210 | 5 | 0.8 |

By comparing the transmission rates appearing in Table I it can be seen that the laminates possessed significantly improved oxygen barrier properties than the PE film, Example 4, and excellent water vapor transmission rates. Compared against the B210 film, Example 5, the laminates possessed good to excellent water vapor transmission rates and acceptable oxygen permeability. Although the exterior layers of the laminates are preferably unmodified polyolefins, Example 2 was prepared with PE-g-MA, establishing that a functionalized polyolefin can also be selected as an exterior layer.

Thus, it should now be evident that the multilayer structures of the present invention exhibit excellent gas and moisture barrier protection in combination with other properties such as thermal resistance, mechanical strength, optical clarity and processability discussed in conjunction with the polymer blends hereinabove. They can also be fabricated into various shapes and forms designed to meet various use requirements. The multilayered structures can also be produced in different colors since the interior layer can be colored or printed in the conventional manner.

It is to be understood that the use of polyolefins having functionality is not limited to those functionalized by copolymerization, e.g., PEMA or by grafting, e.g., PE-g-MA and PP-g-AcA as disclosed herein or by the disclosure of typical polyolefins and unsaturated monomers provided herein which have been provided merely to demonstrate practice of the subject invention. Similarly, practice of the present invention should not be limited to the specific high nitrile polymer exemplified herein. Those skilled in the art may readily select other polyolefins and copolymers and high nitrile polymers according to the disclosure made hereinabove.

Moreover, it is to be understood that the multilayered film products of the present invention can comprise gas barrier polymers other than the high nitrile polymers exemplified herein and likewise, that the exterior layer or layers of water and vapor barrier polymers need not be limited to unfunctionalized polyolefins or even to polyolefins.

Thus, it is believed that any of the variables disclosed herein can readily be determined and controlled without departing from the scope of the invention herein disclosed and described. Moreover, the scope of the invention shall include all modifications and variations that fall within the scope of the attached claims.

We claim:

1. Multilayered high barrier film products comprising:
    at least a first polymer film having low permeability to moisture; and,
    a polymer blend film comprising:
        from about 80 to 99 parts by weight of a high nitrile gas barrier polymer produced by polymerizing a major proportion of a monounsaturated nitrile, a minor proportion of another monovinyl monomer copolymerizable therewith optionally in the presence of a diene rubber, and
        from about 1 to 20 parts by weight of a second polymer selected from the group consisting of polyolefins having from 2 to about 6 carbon atoms, functionalized with an unsaturated compound selected from the group consisting of unsaturated carboxylic acids, esters, anhydrides, and imides for compatibility with said gas barrier polymer so as to allow said polymer blend film to adhere to said first polymer film.

2. Multilayered high barrier film products, as set forth in claim 1, wherein said high nitrile polymer is prepared by the polymerization of 100 parts by weight of (A) from 60 percent to 90 percent by weight of at least one nitrile having the structure $$CH_2=C-CN$$
$$\phantom{CH_2=C-}|$$
$$\phantom{CH_2=C-}R$$

wherein R is hydrogen, a lower alkyl group having from 1 to 4 carbon atoms, or a halogen, and (B) from 10 percent to 40 percent by weight based on the combined weights of (A) and (B) of at least one member selected from the group consisting of (1) an ester having the structure $$CH_2=C-COOR_2$$
$$\phantom{CH_2=C-}|$$
$$\phantom{CH_2=C-}R_1$$

wherein $R_1$ is hydrogen, an alkyl group having from 1 to 6 carbon atoms, or a halogen, and $R_2$ is an alkyl group having from 1 to 30 carbon atoms, (2) an alpha-olefin having the structure $$CH_2=C$$
$$\phantom{CH_2=}/\ \backslash$$
$$\phantom{CH_2}R_3\ \ R_4$$

wherein $R_3$ and $R_4$ are alkyl groups having from 1 to 7 carbon atoms, (3) a vinyl ether selected from the group consisting of methyl vinyl ether, ethyl vinyl ether, the propyl vinyl ethers, and the butyl vinyl ethers, (4) vinyl acetate, (5) styrene, and (6) indene, in the presence of from 0 to 40 parts by weight of (C) a rubbery polymer of a conjugated diene monomer selected from the group consisting of butadiene and isoprene and a comonomer selected from the group consisting of styrene, a monomer having the structure $$CH_2=C-CN$$
$$\phantom{CH_2=C-}|$$
$$\phantom{CH_2=C-}R$$

wherein R has the foregoing designation, and an ester having the structure $$CH_2=C-COOR_2$$
$$\phantom{CH_2=C-}|$$
$$\phantom{CH_2=C-}R_1$$

wherein $R_1$ and $R_2$ have the foregoing respective designations, said rubbery polymer containing from 50 percent to 100 percent by weight of polymerized conjugated diene and from 0 percent to 40 percent by weight of comonomer.

3. Multilayered high barrier film products, as set forth in claim 2, wherein said first polymer film is selected from the group consisting of polyolefins having from 2 to about 6 carbon atoms, amorphous and crystalline polyamides, crystalline polyesters, polycarbonate, methyl methacrylate-styrene copolymer grafted onto a diene elastomer, polyphenylene oxide, polystyrene, polyphenylene oxide/polystyrene copolymers, polyvinylchloride, polyalkyl methacrylates, styrene-acrylonitrile copolymer and acrylonitrile-butadiene-styrene copolymer.

4. Multilayered high barrier film products, as set forth in claim 3, further comprising
a tie layer interposed between said first polymer film and said polymer blend film to increase adhesion therebetween.

5. Multilayered high barrier film products, as set forth in claim 4, wherein said tie layer comprises a polymer selected from the group consisting of chlorinated polyolefins, ethylene vinyl acetate copolymer and functionalized thermoplastic elastomers.

6. Multilayered high barrier film products, as set forth in claim 3, further comprising
a second film of said first polymer having low permeability to moisture, said gas barrier polymer film being sandwiched between said first and second films of said first polymer.

7. Multilayered high barrier film products, as set forth in claim 3, wherein said gas barrier polymer is poly(acrylonitrile-methylacrylate-butadiene).

8. Multilayered high barrier film products, as set forth in claim 7, wherein said functionalized second polymer is poly(ethylene-co-maleic anhydride).

9. Multilayered high barrier film products, as set forth in claim 8, wherein said first polymer film is selected from the group consisting of polyethylene and polypropylene.

10. Multilayered high barrier film products, as set forth in claim 7, wherein said functionalized second polymer is poly(ethylene-g-maleic anhydride).

11. Multilayered high barrier film products, as set forth in claim 10, wherein said first polymer film is selected from the group consisting of polyethylene and polypropylene.

12. Multilayered high barrier film products, as set forth in claim 7, wherein said functionalized second polymer is poly(propylene-g-acrylic acid).

13. Multilayered high barrier film products, as set forth in claim 12, wherein said first polymer film is selected from the group consisting of polyethylene and polypropylene.

14. Multilayered high barrier film products, as set forth in claim 7, wherein said functionalized second polymer is poly(propylene-g-maleic anhydride).

15. Multilayered high barrier film products, as set forth in claim 14, wherein said first polymer film is selected from the group consisting of polyethylene and polypropylene.

16. Multilayered high barrier film products, as set forth in claim 1, wherein said polymer blend film further comprises from about 95 to 5 parts by weight of an unfunctionalized second polymer with a corresponding decrease in one or both components of said polymer blend film to provide 100 total parts by weight.

17. Multilayered high barrier film products, as set forth in claim 7, wherein at least one of said first and second polymer film comprises said first polymer functionalized with an unsaturated compound selected from the group consisting of unsaturated carboxylic acids, esters, anhydrides and imides.

* * * * *